(12) United States Patent
Robb et al.

(10) Patent No.: US 8,739,877 B2
(45) Date of Patent: Jun. 3, 2014

(54) TREATMENT FLUIDS FOR WETTING CONTROL OF MULTIPLE ROCK TYPES AND ASSOCIATED METHODS

(75) Inventors: Ian D. Robb, Lawton, OK (US); Richard D. Rickman, Duncan, OK (US); Jason E. Bryant, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 421 days.

(21) Appl. No.: 12/688,610

(22) Filed: Jan. 15, 2010

(65) Prior Publication Data

US 2011/0174485 A1  Jul. 21, 2011

(51) Int. Cl.
*E21B 43/27* (2006.01)
*E21B 43/26* (2006.01)

(52) U.S. Cl.
USPC .................. 166/308.3; 166/305.1; 166/308.2; 166/300

(58) Field of Classification Search
USPC .................. 166/305.1, 308.1–308.3, 310, 300
See application file for complete search history.

(56) References Cited

U.S. PATENT DOCUMENTS

| | | | |
|---|---|---|---|
| 4,574,885 A * | 3/1986 | Horton ........................ 166/270.1 |
| 5,246,072 A | 9/1993 | Frazier, Jr. et al. |
| 5,663,123 A | 9/1997 | Goodhue, Jr. et al. |
| 6,875,728 B2 | 4/2005 | Gupta et al. |
| 7,398,826 B2 | 7/2008 | Hoefer et al. |
| 7,398,829 B2 * | 7/2008 | Hutchins et al. ............ 166/308.3 |
| 7,779,915 B2 * | 8/2010 | Hutchins et al. ............ 166/308.3 |
| 2002/0132741 A1 * | 9/2002 | Chang et al. .................. 507/240 |
| 2004/0209780 A1 * | 10/2004 | Harris et al. .................. 507/117 |
| 2006/0166836 A1 * | 7/2006 | Pena et al. .................... 507/211 |
| 2007/0114035 A1 | 5/2007 | Parris et al. |
| 2008/0066909 A1 * | 3/2008 | Hutchins et al. ............ 166/280.1 |
| 2011/0174485 A1 | 7/2011 | Robb et al. |
| 2011/0174492 A1 * | 7/2011 | Robb et al. .................. 166/308.2 |

FOREIGN PATENT DOCUMENTS

CN    101316912 A    12/2008
EP    0 037 699 A2   10/1981

OTHER PUBLICATIONS

International Preliminary Report on Patentability for PCT/GB2011/000050 dated Jul. 17, 2012.
Official Action for Chinese Pat. Appl. No. 201180006056.2 dated Dec. 26, 2013.
Official Action for Canadian Patent Application No. 2,785,075 dated Jul. 5, 2013.

* cited by examiner

*Primary Examiner* — Angela M DiTrani
*Assistant Examiner* — Catherine Loikith
(74) *Attorney, Agent, or Firm* — McDermott Will & Emery LLP; Craig W. Roddy

(57) ABSTRACT

Methods for oil and/or gas production may employ mixed surfactants to treat a subterranean formation. The methods can comprise: providing a treatment fluid comprising: an aqueous base fluid, a first surfactant having a charge, a second surfactant having an opposite charge, and a compatibilizer; and introducing the treatment fluid into at least a portion of the subterranean formation.

17 Claims, 1 Drawing Sheet

Bakken (Upper)

Bakken (Middle)

Bakken (Lower)

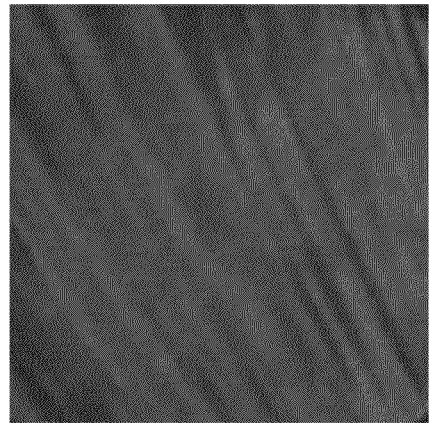
Bakken (Upper)
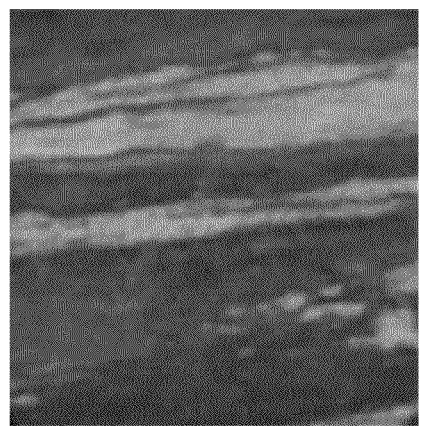
Bakken (Middle)
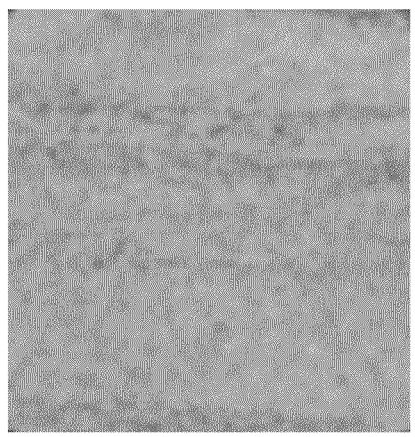
Bakken (Lower)

TREATMENT FLUIDS FOR WETTING CONTROL OF MULTIPLE ROCK TYPES AND ASSOCIATED METHODS

BACKGROUND OF THE INVENTION

The present invention relates to fluids useful for subterranean operations, and more particularly, to mixed surfactants, treatment fluids comprising mixed surfactants, and methods of use employing such mixed surfactants to treat formations comprising multiple rocks.

Various procedures have been developed and utilized that may increase the flow of hydrocarbons from hydrocarbon-containing subterranean formations penetrated by well bores. For example, a conventional production stimulation technique may involve creating and extending fractures in the subterranean formation to provide flow channels therein through which hydrocarbons flow from the formation to the well bore. The fractures may be created by introducing a fracturing fluid into the formation at a rate sufficient to exert a sufficient pressure on the formation to create and extend fractures therein. Solid fracture proppant materials, such as sand, may be suspended in the fracturing fluid so that upon introducing the fracturing fluid into the formation and creating and extending fractures therein, the proppant material may be carried into the fractures and deposited therein. Such a treatment may prevent the fractures from closing due to subterranean forces when the introduction of the fracturing fluid has ceased.

Water-based fluids are typically used to fracture the subterranean formation, and when treated with conventional surfactants to recover the fracturing fluid, typically only a small portion of the fracturing fluid can be recovered. The aqueous fluid retained in the formation may increase the water saturation level of the formation, adversely affecting, among other things, the relative permeability to hydrocarbon flow, effective flow area, fracture length and the well productivity.

The water saturation levels of the formation may also increase due to, among other things, cross flow from water-bearing zones or other regions of the formation and filtrate invasion from water-based drilling fluids. In the latter case, the water saturation level of the formation near the well bore may be especially high, which may lower the relative permeability of the formation and thus the production of hydrocarbons by the water-blocked formation.

In gas wells, besides water blocks, liquid hydrocarbons may accumulate and lower the permeability of the formation rocks. Moreover, liquid hydrocarbons that condense out of the gas phase due to the decline in pressure below the dew point pressure of the gas also may hinder the production of hydrocarbons.

Several conventional surfactants have been used in attempts to alleviate these problems. Surfactants, which contain a hydrophilic and a hydrophobic group, are mixed with a treatment fluid, inter alia, to lower the surface tension of the fluid in order to facilitate the cleanup and mitigate formation damage caused by either water blocks or gas condensates. In addition to lowering surface tension, surfactants also may change the formation wettability. This results from a decrease in the capillary pressure of the flow channels in the subterranean formation, which may be accomplished by, among other things, changing the contact angle so that clean-up process can be very facile and hydrocarbon can flow with less resistance.

Cationic, anionic and zwitterionic surfactants may be used to enhance the production of hydrocarbons. While these surfactants have been used successfully, there may be disadvantages. Formations are commonly made up of various rocks. In general, different types of surfactants provide better treatment for each type of rock. For example, anionic surfactants are better for limestone formations and cationic surfactants are better for sandstone formations. Using a mixture of surfactants to treat the various rock may be difficult since at least some portion of the surfactants may precipitate with each other inadvertently, which may hinder or prevent optimal production of hydrocarbons. In addition, anionic surfactants on their own can also be sensitive to precipitation with multivalent cations further preventing optimal hydrocarbon production.

SUMMARY OF THE INVENTION

The present invention relates to fluids useful for subterranean operations, and more particularly, to mixed surfactants, treatment fluids comprising mixed surfactants, and methods of use employing such mixed surfactants to treat formations comprising multiple rocks.

In one embodiment, the methods of the present invention comprise: providing a treatment fluid comprising: an aqueous base fluid, a first surfactant having a charge, a second surfactant having an opposite charge, and a compatibilizer; and introducing the treatment fluid into at least a portion of the subterranean formation.

In another embodiment, the methods of the present invention comprise: providing a fracturing fluid comprising: an aqueous base fluid, a first surfactant having a charge, a second surfactant having an opposite charge, and a compatibilizer; and introducing the fracturing fluid into at least a portion of a subterranean formation at a rate and pressure sufficient to create or enhance at least one or more fractures in the subterranean formation.

In yet another embodiment, the methods of the present invention comprise: providing a fracturing fluid comprising: an aqueous base fluid, a first surfactant having a charge, a second surfactant having an opposite charge, and a compatibilizer; and introducing the fracturing fluid into at least a portion of a subterranean zone comprising a first rock having an affinity for the first surfactant and a second rock having an affinity for the second surfactant.

Other features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

FIG. 1 shows a photo of cores taken from the Bakken formation in North Dakota.

DESCRIPTION OF PREFERRED EMBODIMENTS

The present invention relates to fluids useful for subterranean operations, and more particularly, to mixed surfactants, treatment fluids comprising mixed surfactants, and methods of use employing such mixed surfactants.

Of the many advantages of the compositions and related methods of the present invention (only some of which are alluded to herein), is that the mixed surfactant blend may improve wettability in the treated portion of the mixed formation and improve hydrocarbon production. Different types of surfactants are better at treating different types of formations since their affinity for the formations depends on both the surfactant and rock type. Many combinations of surfactants are incompatible with one another and this can lead to their precipitation. Another advantage of the present invention includes the ability to maintain various surfactants compatible in a treatment fluid. Without being limited by theory, once introduced into the formation, the mixed surfactants are thought to better adsorb onto the various rock surfaces in the treated portion of the formation. Once adsorbed, it is believed that each surfactant may increase the contact angle between water and the various surfaces of the rock in the formation. By way of example, the contact angle may be increased from less than 90° to an angle closer to 90°. This may directly (or indirectly) lead to reduced capillary pressure inside the pores of the formation. Reduced capillary pressure may lead to increased water-flow rates. As will be appreciated, improved water-flow rates should allow a reduction in existing water blocks, as well as a reduction in the formation of water blocks thereby leading to improved hydrocarbon production. Mixed surfactants may combine to produce lower surface tensions than some single surfactants. In addition, mixed surfactants may be more tolerant to salts. For example, anionic surfactants tend to precipitate with multivalent cations. This tendency is reduced by mixing the anionic surfactants with nonionic surfactants. Furthermore, nonionic surfactants generally have lower cloud points in brines than in pure water leading to lower foaming properties. Mixed surfactants have a raised cloud point and better foaming properties.

In accordance with embodiments of the present invention, the treatment fluids generally comprise an aqueous base fluid, a first surfactant having a charge, a second surfactant having an opposite charge, and a compatibilizer.

By way of example, the aqueous base fluid of embodiments of the treatment fluids of the present invention may be any fluid comprising an aqueous component. Suitable aqueous components include, but not limited to, fresh water, salt water, brine (e.g., saturated or unsaturated saltwater), seawater, and any combination thereof. Generally, the aqueous component may be from any source. Suitable aqueous base fluids may include foams. One of ordinary skill in the art, with the benefit of the present disclosure, will recognize suitable aqueous base fluids for use in the treatment fluids and methods of the present invention. In some embodiments, the aqueous base fluid may be present in a treatment fluid of the present invention in an amount in the range of about 75% to about 99.9% of the treatment fluid.

The first and second surfactants of embodiments of the treatment fluids of the present invention may be any suitable surfactant having a positive charge. Examples of cationic surfactants include, but are not limited to, alkyl quaternaryammonium compounds, alkyl trialkylammonium bromides, dialkyldiethylammonium chlorides, alkyl imidazolines, polyethoxylated alkyl ammonium chlorides, alkyldimethylbenzyl ammonium chlorides, alkylpyridinium chlorides, alkyl diammonium pentamethyl chlorides, and any derivative and combinations thereof. As used herein, term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

In an embodiment, the first and second surfactant of the treatment fluids of the present invention may be any suitable surfactant having a negative charge. Examples of anionic surfactants include, but not limited to, alkyl sulfates, alkyl sulfonates, alkyl aryl sulfonates, alkyl aryl sulfates, olefin sulfonates, fatty acid salts, fatty acid ester sulfonates, alkyl ether sulfates, alkyl ether phosphates, alkyl phosphate esters, alkylalcohol ethoxylate phosphate esters, alkyl phenol ethoxylate phosphates, phenol ethoxylate phosphates, alkyl ether carboxylates dialkyl sulfosuccinates, perfluoroalkanoic acids, sodium alkyl sarcosinates, and any derivitatives and combinations thereof. In embodiments of the present invention, the first and second surfactants may be selected from surfactants having opposite charges.

Sufficient concentrations of suitable charged surfactants may be present in the treatment fluids of the present invention to provide a desired effect. The amount of the cationic or anionic surfactant to include in the treatment fluid depends on a number of factors including, but not limited to, the composition and the porosity of the subterranean formation. In some embodiments, the first and second surfactants may be present in a treatment fluid of the present invention in an amount in the range of about 0.001% to about 3% by volume of the treatment fluid. In some embodiments, the first and second surfactant may be present in an amount in the range of about 0.01% to about 0.5% by volume of the treatment fluid. In certain embodiments of the present invention, the first, the second, or both surfactants may be provided in a concentrated solution prior to their combination with the other components necessary to form a treatment fluid of the present invention.

Formations are broadly grouped into two types depending on the types and relative abundances of the minerals present, siliceous and carbonaceous. In certain embodiments, the treated formation may comprise a first rock having an affinity for the first surfactant and a second rock having an affinity for the second surfactant. An example of such a formation is the Bakken formation found in North Dakota and shown in FIG. 1. Cationic surfactants are effective in treating silica surfaces whereas anionic surfactants effectively treat carbonate surfaces. When shale and other low permeability formations comprising mixed rocks are treated with either only a cationic or only an anionic surfactant, the formation remains partially treated and fluids may still be immobilized in the untreated zones. The present invention provides treatment fluids that may effectively alter the wettability of all surfaces in these types of formations by utilizing a mixture of cationic and anionic surfactants.

A compatibilizer may be included to the treatment fluids of the present invention to prevent an undesirable interaction between the cationic and anionic surfactants that leads to their precipitation out of the treatment fluids and their inability to deposit effectively on the formation surface. Suitable compatibilizers for use in the present invention include any type of compatibilizer that is capable of performing this function. In certain embodiments, the compatibilizer may be a nonionic surfactant. Examples of suitable nonionic surfactants include, but are not limited to, alkyl ethoxylates, alkyl phenol ethoxylates, sorbitan fatty acid esters, ethoxylated sorbitan fatty acid esters, alkyl polyglucosides, ethoxylated alkylamines, polyamineethoxylated diamines, alkylpropoxylated amines, fatty alcohols, alkylamide monoethanolamines, alkylamide diethanolamines, alkyldialkylamine oxides, alkylamides, ethoxylated amides alkoxylated alkyl phenols, alkoxylated alcohols, polyols, polyol esters, and any derivatives and combinations thereof. In an embodiment, the compatibilizer may be an amphoteric surfactant. Examples of suitable amphoteric surfactants include, but are not limited to, alkylamidopropyl betaines, alkyl iminodipropionate disodiums, alkylamphodiacetate disodiums, alkylampho hydroxypropyl sulfonate sodiums, alkylamidopropylhydroxysultaines, lecithins, and any deribatives and combinations thereof.

Sufficient concentrations of compatibilizer may be present in the treatment fluids of the present invention to provide a desired effect. The amount of the compatibilizer to include in the treatment fluid depends on a number of factors including, but not limited to, the composition and the porosity of the subterranean formation. In some embodiments, the compatibilizer may be present in a treatment fluid of the present invention in an amount in the range of about 0.001% to about 3% by volume of the treatment fluid. In some embodiments, the first and second surfactant may be present in an amount in the range of about 0.01% to about 0.5% by volume of the treatment fluid. In certain embodiments of the present invention, the compatibilizer may be provided in a concentrated solution prior to their combination with the other components necessary to form a treatment fluid of the present invention. In certain embodiments of the present invention, the compatibilizer may be added in equal concentration as the cationic surfactant.

Depending on the use of the treatment fluid, in some embodiments, other additives may optionally be included in the treatment fluids of the present invention. Examples of such additives may include, but are not limited to, friction reducing polymers, corrosion inhibitors, particulates, acids, breakers, scale inhibitors, clay stabilizers, and any combinations thereof. A person of ordinary skill in the art, with the benefit of this disclosure, will recognize when such optional additives should be included in a treatment fluid used in the present invention, as well as the appropriate amounts of those additives to include.

The treatment fluids of the present invention may comprise a water soluble polymer that reduces energy losses within the treatment fluids. In certain embodiments, the water soluble polymers may act as friction reducing polymers. For example, friction reducing polymers may reduce energy losses upon introduction of the aqueous treatment fluid into a well bore due to friction between the aqueous treatment fluid in turbulent flow and the formation or in the well bore. Any friction reducing polymer suitable for use in subterranean applications may be suitable for use in the present invention. In an embodiment, the aqueous treatment fluids of the present invention may comprise a friction reducing polymer that comprises acrylamide and an ionic comonomer. In one embodiment, the friction reducing polymer may comprise acrylamide and an acrylic acid. The friction reducing polymer included in the treatment fluids of the present invention may comprise any suitable polysaccharide that may be capable of being crosslinked, including, but not limited to, diutan gums, xanthan gums, and other polysaccharides including galactomannans, cellulose derivatives, derivatives thereof, and any combination thereof. Other suitable gums include, but are not limited to, hydroxyethylguar, hydroxypropyl guar, carboxymethyl guar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The crosslinkable polymers included in the treatment fluids of the present invention may be naturally-occurring, synthetic, or a combination thereof.

Generally, a friction reducing polymer of the present invention may be included in any aqueous treatment fluid used in subterranean treatments to reduce friction. Such subterranean treatments include, but are not limited to, stimulation treatments (e.g., fracturing treatments, acidizing treatments, fracture acidizing treatments) and remedial operations. The friction reducing polymers of the present invention may have either an anionic or cationic nature. Those of ordinary skill in the art, with the benefit of this disclosure, will be able to recognize a suitable subterranean treatment where friction reduction may be desired. While the friction reducers of the present invention may be suitable for use in a variety of aqueous treatment fluids, they may be particularly useful in treatment fluids wherein a friction reducing polymers' reduced sensitivity to salt is desired.

The friction reducing polymers of the present invention comprise acrylamide and an ionic monomer such as acrylic acid, methacrylic acid, AMPS, DMEAMA. Generally, the ionic monomer present in the friction reducing copolymers of the present invention may be any monomer that maximizes friction reduction while minimizing flocculation and salt intolerance. In determining a suitable ionic monomer for use in the present invention, a variety of techniques may be used including, but not limited to, determining the radius of gyration for a particular friction reducing copolymer in the presence of interfering salts. Generally, including an ionic monomer that will give the copolymer a larger radius of gyration is desirable. It is believed that friction reducing agents possess large radii of gyration, in addition to generally having a molecular weight greater than 1,500,000 atomic mass units ("amu"). The ionic comonomer included in the friction reducing agents of the present invention are believed to increase radii of gyration through electrostatic repulsion, relative to those polymers composed entirely of acrylamide. Those of ordinary skill in the art, with the benefit of this disclosure, will be able to select an appropriate ionic comonomer to include in the friction reducing copolymers of the present invention based on a variety of factors, including the desired level of friction reduction and flocculation properties.

The amount of acrylamide and ionic comonomer to include in the friction reducing copolymers of the present invention may be determined based on a number of factors, including the desired friction reduction, flocculation properties, etc. Generally, the acrylamide may be present in the friction reducing copolymers of the present invention in an amount in the range of from about 60% to about 95% by weight and an ionic comonomer in an amount in the range of from about 5% to about 40% by weight.

The friction reducing polymers of the present invention should have a molecular weight sufficient to provide a desired level of friction reduction. Generally, friction reducing copolymers having higher molecular weights may be needed to provide a desirable level of friction reduction. For example, in some embodiments, the weight average molecular weight of the friction reducing copolymers may be in the range of from about 1,500,000 to about 20,000,000, as determined using intrinsic viscosity, light scattering or gel permeation chromatography. Those of ordinary skill in the art will recognize that friction reducing copolymers having molecular weights outside the listed range may still provide some degree of friction reduction in an aqueous treatment fluid.

The friction reducing polymers of the present invention should be included in the aqueous treatment fluids of the present invention in an amount sufficient to provide the desired reduction of friction. In some embodiments, a friction reducing polymer of the present invention may be present in an amount in the range of from about 0.01% to about 3% by weight of the treatment fluid. In some embodiments, a water soluble polymer of the present invention may be present in an amount in the range of from about 0.05% to about 0.3% by weight of the treatment fluid.

The friction reducing polymers suitable for use in the present invention may be delivered in accordance with any of a variety of methods such as a water-in-oil emulsion or a water-continuous dispersion. In one embodiment, a suitable friction reducing polymer may be added in powder form. Those of ordinary skill in the art, with the benefit of this disclosure, will recognize an appropriate method to synthesize and provide a suitable friction reducing polymer.

The treatment fluids of the present invention may comprise particulates, such as proppant particulates or gravel particulates. Such particulates may be included in the treatment fluids of the present invention, for example, when a gravel pack is to be formed in at least a portion of the well bore or a proppant pack is to be formed in one or more fractures in the subterranean formation. Particulates suitable for use in the present invention may comprise any material suitable for use in subterranean operations. Suitable materials for these particulates may include, but are not limited to, sand, bauxite, ceramic materials, glass materials, polymer materials, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

An embodiment of a method of the present invention comprises introducing a treatment fluid into a subterranean formation, wherein the treatment fluid comprises an aqueous base fluid, a first surfactant having a charge, a second surfactant having an opposite charge, and a compatibilizer. The treatment fluids and methods of the present invention may be useful in other operations performed in subterranean formations. Such operations include, but are not limited to, a drill-in operation, a fracturing operation, a well bore cleanup operation, a viscous sweep, a fines control operation, a gravel packing operation, a frac pack operation, an acidizing operation, a stimulation operation, and any combination thereof. For example, it may be desirable to include the cationic and anionic surfactant in a fluid used in fracturing, or acidizing to improve wettablility of the formation and reduce water blocks and/or gas condensates that may invade the production zone. One of ordinary skill in the art, with the benefit of the present disclosure, will recognize suitable operations in which the treatment fluids of the present invention may be used.

In certain embodiments, the treatment fluids of the present invention may be used in fracturing operations in a subterranean formation. In these embodiments, a treatment fluid of the present invention may be pumped into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluids of the present invention used in these embodiments optionally may comprise particulates, often referred to as "proppant particulates," that may be deposited in the fractures. The proppant particulates may function, inter alia, to prevent one or more of the fractures from fully closing upon the release of hydraulic pressure, forming conductive channels through which fluids may flow to the well bore. Once at least one fracture is created and the proppant particulates are substantially in place, the viscosity of the treatment fluid of the present invention may be reduced (e.g., through the use of a gel breaker, or allowed to reduce naturally over time) to allow it to be recovered.

In certain embodiments, the treatment fluids of the present invention may be used in acidizing and/or acid fracturing operations. In these embodiments, a portion of the subterranean formation is contacted with a treatment fluid of the present invention comprising one or more organic acids (or salts thereof) and one or more inorganic acids (or salts thereof), which interact with subterranean formation to form "voids" (e.g., cracks, fractures, wormholes, etc.) in the formation. After acidization is completed, the treatment fluid of the present invention (or some portion thereof) may be recovered to the surface. The remaining voids in the subterranean formation may, inter alia, enhance the formation's permeability, and/or increase the rate at which fluids subsequently may be produced from the formation. In certain embodiments, a treatment fluid of the present invention may be introduced into the subterranean formation at or above a pressure sufficient to create or enhance one or more fractures within the subterranean formation. In other embodiments, a treatment fluid of the present invention may be introduced into the subterranean formation below a pressure sufficient to create or enhance one or more fractures within the subterranean formation.

In one embodiment, the present invention provides methods that include a method comprising: providing a fracturing fluid comprising an aqueous base fluid, a first surfactant having a charge, a second surfactant having an opposite charge, and a compatibilizer; and introducing the fracturing fluid into at least a portion of a subterranean formation at a rate and pressure sufficient to create or enhance at least one or more fractures in the subterranean formation.

In one embodiment, the present invention provides methods that include a method comprising: providing a fracturing fluid comprising an aqueous base fluid, a first surfactant having a charge, a second surfactant having an opposite charge, and a compatibilizer; and introducing the fracturing fluid into at least a portion of a subterranean zone comprising a first rock having an affinity for the first surfactant and a second rock having an affinity for the second surfactant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid consisting essentially of:
   1) an aqueous base fluid, a first surfactant having a charge, a second surfactant having an opposite charge, and a compatibilizer, or
   2) an aqueous base fluid, a first surfactant having a charge, a second surfactant having an opposite charge, a compatibilizer, and an additive selected from the group consisting of a corrosion inhibitor, a particulate, an acid, a breaker, a scale inhibitor, a clay stabilizer, and any combination thereof; and
   wherein the compatibilizer comprises a nonionic surfactant or an amphoteric surfactant and wherein the compatibilizer prevents precipitation from the interaction of the first surfactant having a charge with the second surfactant having an opposite charge;
   introducing the treatment fluid into at least a portion of a subterranean formation.

2. The method of claim 1 wherein the aqueous base fluid comprises a fluid selected from the group consisting of fresh water, salt water, brine, seawater, and any combination thereof.

3. The method of claim 1 wherein the first surfactant or the second surfactant is selected from the group consisting of an alkyl quaternaryammonium compound, an alkyl trialkylammonium bromide, a dialkyldiethylammonium chloride, an alkyl imidazoline, a polyethoxylated alkylammonium chloride, an alkyldimethylbenzylammonium chloride, an alkylpyridinium chloride, an alkyl diammonium pentamethyl chloride, and any combination thereof.

4. The method of claim 3 wherein the first surfactant or the second surfactant is selected from the group consisting of an alkyl sulfate, an alkyl sulfonate, an alkyl aryl sulfonate, an alkyl aryl sulfate, an olefin sulfonate, a fatty acid salt, a fatty acid ester sulfonate, an alkyl ether sulfate, an alkyl ether phosphate, an alkyl phosphate ester, an alkylalcohol ethoxylate phosphate ester, an alkyl phenol ethoxylate phosphate, a phenol ethoxylate phosphate, an alkyl ether carboxylate dialkyl sulfosuccinate, a perfluoroalkanoic acid, a sodium alkyl sarcosinate, and any combination thereof.

5. The method of claim 1 wherein the treatment fluid comprises the first and second surfactants in an amount of about 0.01% to about 3% by volume of the treatment fluid.

6. The method of claim 1 wherein the treatment fluid comprises the compatibilizer in an amount of about 0.01% to about 3% by volume of the treatment fluid.

7. The method of claim 1 wherein the compatibilizer is selected from the group consisting of an alkyl ethoxylate, an alkyl polyglucoside, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amide alkoxylated alkyl phenol, an alkoxylated alcohol, a polyol, a polyol ester, an alkyliminodipropionate disodium, an alkylamphodiacetate disodium, an alkylampho hydroxypropyl sulfonate sodium, an alkylamidopropylhydroxysultaine, a lecithin, and any combination thereof.

8. The method of claim 1 wherein the treatment fluid is used as part of an oilfield operation selected from the group consisting of a drill-in operation, a fracturing operation, a well bore cleanup operation, a viscous sweep, a fines control operation, a gravel packing operation, a frac pack operation, an acidizing operation, a stimulation operation, and any combination thereof.

9. The method of claim 1 wherein the subterranean formation comprises a first rock having an affinity for the first surfactant and a second rock having an affinity for the second surfactant.

10. A method comprising:
    providing a fracturing fluid comprising:
    an aqueous base fluid,
    proppant particulates,
    a first surfactant having a charge,
    a second surfactant having an opposite charge, and
    a compatibilizer, wherein the compatibilizer comprises a nonionic surfactant or an amphoteric surfactant and wherein the compatibilizer prevents precipitation from the interaction of the first surfactant having a charge with the second surfactant having an opposite charge; and
    introducing the fracturing fluid into at least a portion of a subterranean formation at a rate and pressure sufficient to create or enhance at least one or more fractures in the subterranean formation.

11. The method of claim 10 wherein the aqueous base fluid comprises a fluid selected from the group consisting of fresh water, salt water, brine, seawater, and any combination thereof.

12. The method of claim 10 wherein the first surfactant or the second surfactant is selected from the group consisting of an alkyl quaternaryammonium compound, an alkyl trialkylammonium bromide, a dialkyldiethylammonium chloride, an alkyl imidazoline, a polyethoxylated alkylammonium chloride, an alkyldimethylbenzylammonium chloride, an alkylpyridinium chloride, an alkyl diammonium pentamethyl chloride, and any combination thereof.

13. The method of claim 12 wherein the first surfactant or the second surfactant is selected from the group consisting of an alkyl sulfate, an alkyl sulfonate, an alkyl aryl sulfonate, an alkyl aryl sulfate, an olefin sulfonate, a fatty acid salt, a fatty acid ester sulfonate, an alkyl ether sulfate, an alkyl ether phosphate, an alkyl phosphate ester, an alkylalcohol ethoxylate phosphate ester, an alkyl phenol ethoxylate phosphate, a phenol ethoxylate phosphate, an alkyl ether carboxylate dialkyl sulfosuccinate, a perfluoroalkanoic acid, a sodium alkyl sarcosinate, and any combination thereof.

14. The method of claim 10 wherein the treatment fluid comprises the first and second surfactants in an amount of about 0.03% to about 10% by weight of the treatment fluid.

15. The method of claim 10 wherein the treatment fluid comprises the compatibilizer in an amount of about 0.01% to about 3% by volume of the treatment fluid.

16. The method of claim 10 wherein the compatibilizer is selected from the group consisting of an alkyl ethoxylate, alkyl polyglucoside, a polyamine-ethoxylated diamine, an alkylpropoxylated amine, a fatty alcohol, an alkylamide monoethanolamine, an alkylamide diethanolamine, an alkyldialkylamine oxide, an alkylamide, an ethoxylated amide alkoxylated alkyl phenol, an alkoxylated alcohol, a polyol, a polyol ester, an alkyliminodipropionate disodium, an alkylamphodiacetate disodium, an alkylampho hydroxypropyl sulfonate sodium, an alkylamidopropylhydroxysultaine, a lecithin, and any combination thereof.

17. A method comprising:
providing a fracturing fluid comprising:
 an aqueous base fluid,
 a first surfactant having a charge,
 a second surfactant having an opposite charge, and
 a compatibilizer, wherein the compatibilizer comprises a nonionic surfactant or an amphoteric surfactant and wherein the compatibilizer prevents precipitation from the interaction of the first surfactant having a charge with the second surfactant having an opposite charge; and
introducing the fracturing fluid into at least a portion of a subterranean zone comprising a first rock having an affinity for the first surfactant and a second rock having an affinity for the second surfactant, the first rock comprising a siliceous mineral and the second rock comprising a carbonate mineral.

* * * * *